June 6, 1967  T. F. JOHNSON ETAL  3,323,336
DRYING SYSTEM FOR DRY CLEANING APPARATUS
Filed May 7, 1965  7 Sheets-Sheet 1

INVENTORS
THEODORE F. JOHNSON
ALBANIS P. McCANDLISH
BY
George H. Fritzinger
AGENT June 6, 1967   T. F. JOHNSON ETAL   3,323,336
DRYING SYSTEM FOR DRY CLEANING APPARATUS
Filed May 7, 1965   7 Sheets-Sheet 2

INVENTORS
THEODORE F. JOHNSON
ALBANIS P. McCANDLISH
BY George H. Fritzinger
AGENT

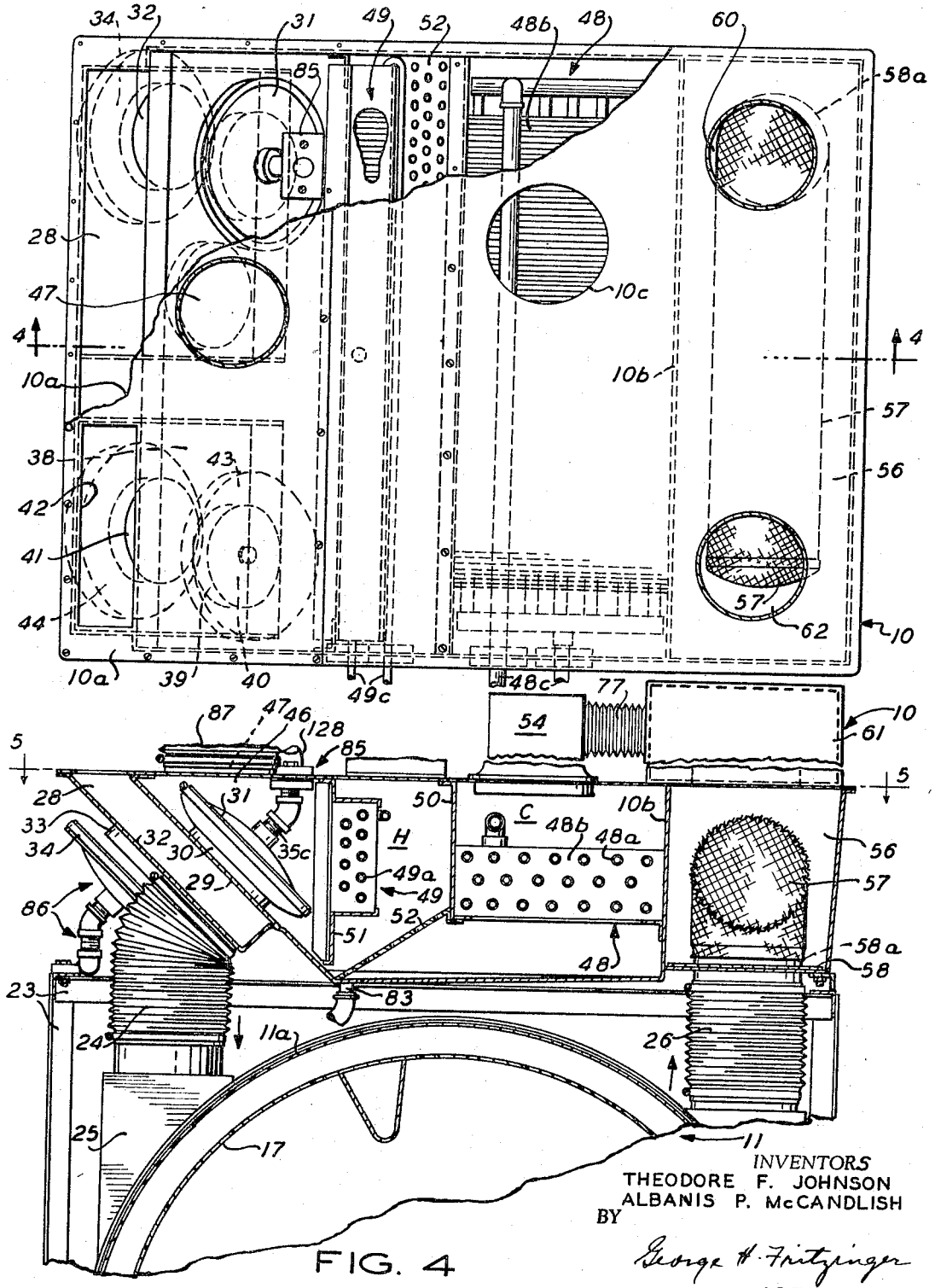

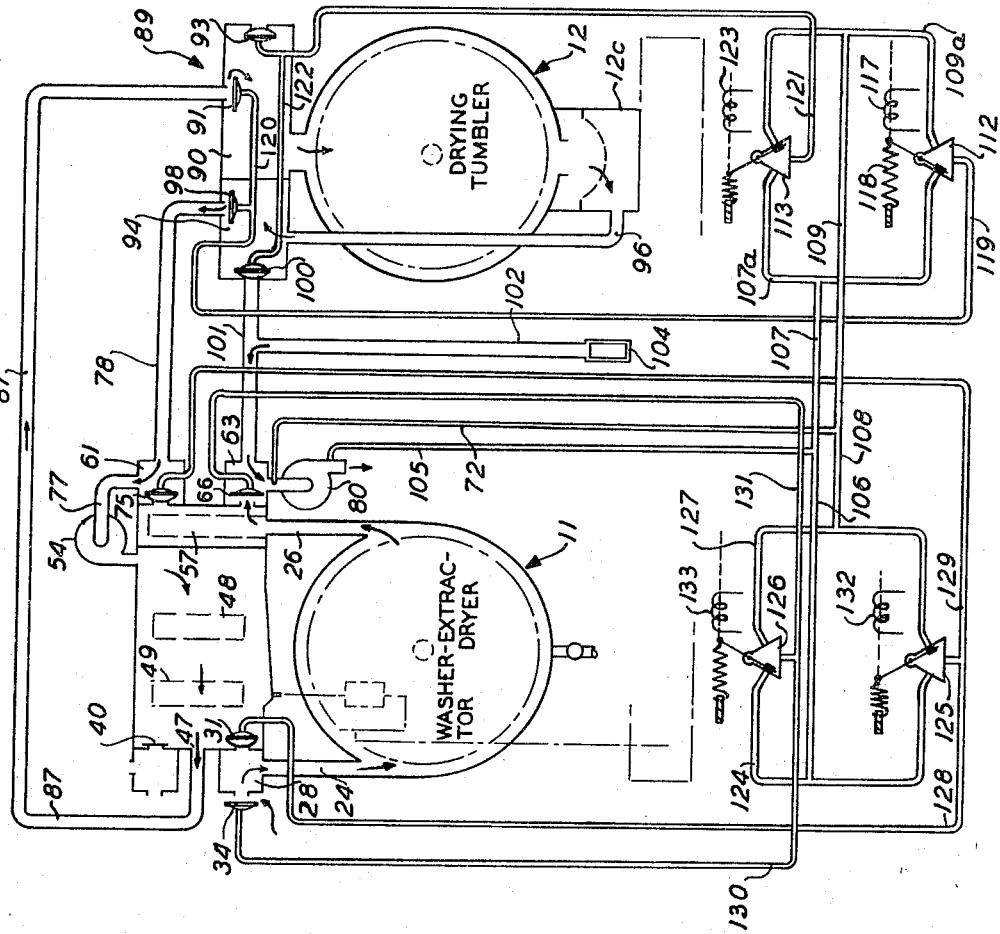

INVENTORS
THEODORE F. JOHNSON
ALBANIS P. McCANDLISH

By George H. Fritzinger
AGENT

United States Patent Office 3,323,336
Patented June 6, 1967

1

3,323,336
DRYING SYSTEM FOR DRY CLEANING
APPARATUS
Theodore F. Johnson and Albanis P. McCandlish, Cincinnati, Ohio, assignors to McGraw-Edison Company, a corporation of Delaware
Filed May 7, 1965, Ser. No. 453,909
6 Claims. (Cl. 68—18)

This invention relates to a new and improved drying system for dry cleaning apparatus and more especially to an improved method and apparatus for recovering the dry cleaning fluid used in such apparatus.

The invention is herein particularly shown and described in connection with the cleansing of garments and similar materials but may be used in other similar apparatus such as for the degreasing of metal parts, etc.

The invention is concerned with the pickup and reclaiming of solvent vapors from the washer-extractor-dryer (herein sometimes referred to as a W.E.D.) and from the drying tumbler of a dry cleaning apparatus. An object of the invention is to provide a novel solvent reclamation system which is very efficient and dependable.

One type of dry cleaning apparatus, sometimes referred to as a "hot" unit, is the washer-extractor-dryer (W.E.D.). The garments are placed in the perforated tub and the door is closed to seal the unit. The tub is then rotated slowly as liquid solvent such as perchlorethylene is circulated through the garments to remove the soil therefrom. After a predetermined period of such washing, the tub is rotated at a high speed to extract the solvent by centrifugal force. Thereafter, the tub is again rotated at slow speed, and hot air is circulated through the garments is a closed system to remove the embedded solvent. This closed system includes a cooling-chamber where the solvent vapors are condensed and returned to the reservoir, and a heating chamber where the circulating air is heated before it is passed again through the garments. This cycle is continued until the drying-reclamation is completed. While still being tumbled at the low speed, the garments are next subjected to a brief freshening or deodorizing operation in which relatively cool air is drawn in from the room, passed through the garments and vented to the outside. The purpose is to remove residual solvent odor from the garments.

Another type of dry cleaning apparatus, sometimes termed a "cold" or transfer unit, comprises two machines, a washer-extractor (W.E.) and a drying tumbler. Unlike the W.E.D., the W.E. is not equipped for drying-reclaiming. After the garments have been washed and extracted they must be transferred to the tumbler, which is equipped with drying-reclaiming means.

An important element in any drying operation, whether in a W.E.D. or in a drying tumbler, is the reclamation apparatus by which the solvent vapors are removed from the circulating air, and the air reheated. An object of the present invention is to provide an improved reclamation head with suitable air piping and control apparatus by which a single reclamation head can serve one or more washer-extractor-dryers and/or one or more drying tumblers at the same time for the drying-reclaiming and freshening operations.

Another object of the invention is to provide such control and piping apparatus with diaphragm-type dampers which are opened by suction from the input side of the air-circulating blowers and which are closed by pressure from the output side of these blowers.

Another object is to provide a novel control system including solenoid-operated valves for controlling the pressure and suction lines leading to the diaphragm-type dampers.

2

Other objects and features lie in the details of construction and in the novel combination of parts by which a highly economical and dependable dry cleaning apparatus is achieved, and will be apparent from the following description and the appended claims.

In the description of the invention, reference is had to the accompanying drawings, of which:

FIGURE 4 is a vertical sectional view of the reclamation head and of an upper portion of the washer-extractor-dryer taken on the line 4—4 of FIGURE 3;

FIGURE 5 is a horizontal sectional view through the reclamation head taken on the line 5—5 of FIGURE 4 and showing portions broken away;

FIGURE 7 is a fractional sectional view of one of the diaphragm dampers used in the machine;

FIGURE 8 is a fractional vertical sectional view taken on the line 8—8 of FIGURE 3 showing a damper box for connecting the reclamation head to another washer-extractor-dryer.

FIGURE 9 is a sectional view taken through one of the damper boxes on the line 9—9 of FIGURE 2;

FIGURE 10 is a left hand end view of the damper box on the tumbler taken from the line 10—10 of FIGURE 2 and showing portions broken away;

FIGURE 11 is a vertical sectional view taken through the tumbler damper box on the line 11—11 of FIGURE 10;

FIGURE 12 is a fractional sectional view taken across the outlet of the air freshener blower on the line 12—12 of FIGURE 3;

FIGURE 13 is a fractional top plan view of one of the damper control valves taken from the line 13—13 of FIGURE 10;

FIGURE 14 is a diagrammatic view of the air flow and damper control system of the combination machine shown in the preceding figures;

Figure 1:
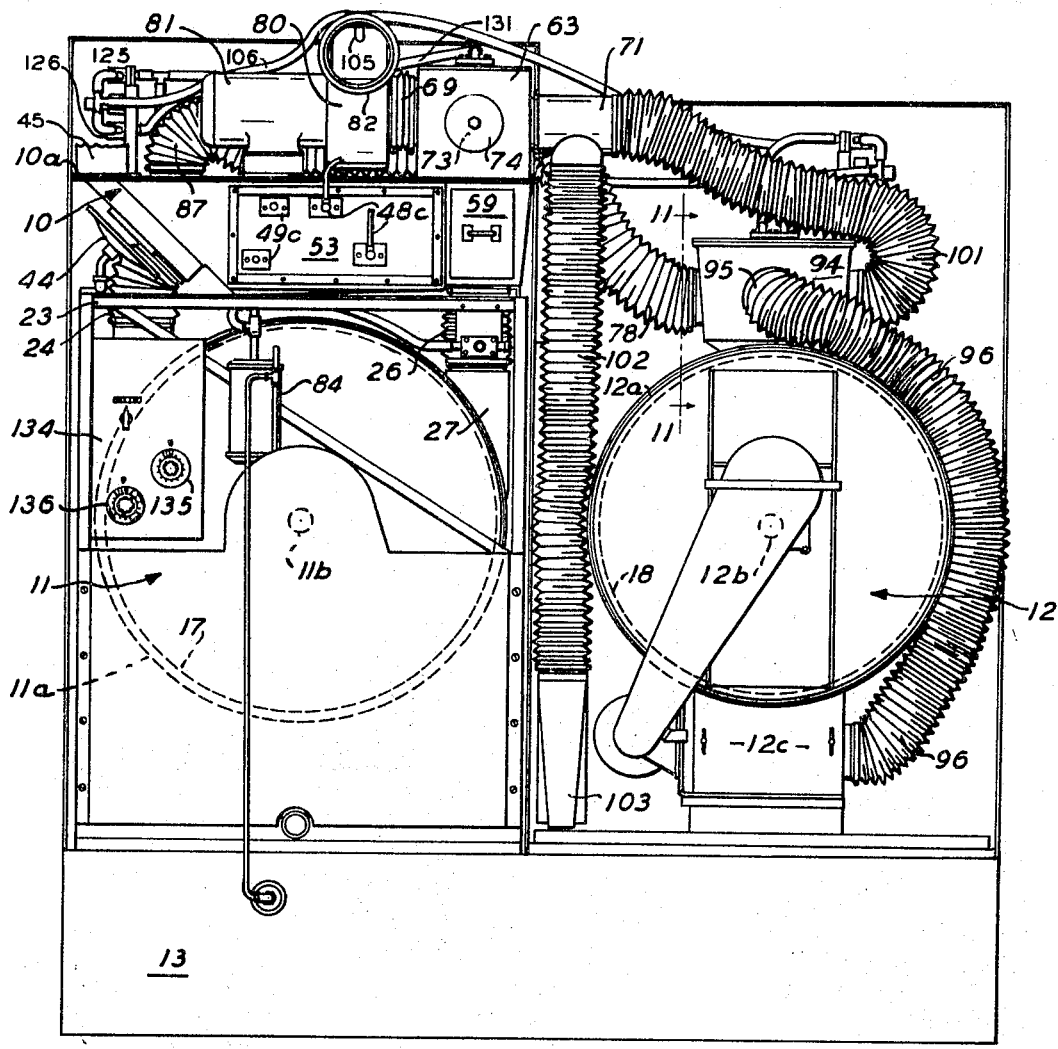
FIGURE 1 is a rear elevational view of a combination machine according to our invention including a washer-extractor-dryer and a drying tumbler both operable from a single reclamation head, the solvent circulating means being however not shown.
Figure 6:
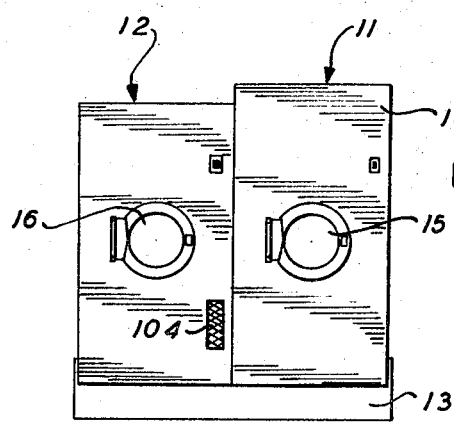
FIGURE 6 is a front elevational view of the combination machine comprising a single washer-extractor-dryer and single drying tumbler.

The illustrative embodiment of our invention as shown in FIGURES 1 to 14 comprises a washer-extractor-dryer 11 and a drying tumbler 12 mounted in respective cabinets alongside one another to form a unit as shown in FIGURE 6. At the bottom of this unit is a tank 13 serving as a reservoir for a cleaning solvent such as perchlorethylene. The washer-extractor-dryer 11 and the drying tumbler 12 have respective front-loading doors 15 and 16. The door 15 controls an opening to a casing 11a in which is mounted a perforated cylinder tub 17 of the washer-extractor-dryer supported at the back by a horizontal drive shaft 11b (FIGURES 1 and 3). The drive means for the tub 17 may be standard and is not herein shown. The pumping means for circulating the liquid solvent from the reservoir 13 through the casing 11a comprises a pipe 17a, a pump 19, a button trap 20, a filter 21 and a cooker-still 22, as shown in FIGURE 3. The door 16 for the drying tumbler controls an opening to a casing 12a in which is mounted a perforated cylinder tub 18 supported at the rear by a horizontal drive shaft 12b. The drive means for this shaft is also not herein shown. A front panel 14 for the washer-extractor-dryer and a right side panel 14a are shown in FIGURE 3.

A reclamation head 10 is mounted above the washer-extractor-dryer 11 on a frame 23 and includes an intermediate horizontal mounting plate 10a as shown in FIGURES 1 to 4. It is during a drying operation when air is circulated through the casing 11a that the reclamation head serves first to condense out the solvent vapor and then reheat the circulating air before it is returned to the casing 11a. As shown in FIGURE 4, the closed circulating system for carrying out a drying operation runs from a blower 54 through a condenser chamber C including a condenser 48, a perforated plate 52, a heating chamber H including a heater 49, a hot air chamber 46, a port 29 into a damper chamber 28 which is now closed at its port 32 by the diaphragm damper 34, an air duct 24 into the casing 11a, an air duct 26 leading from the casing 11a, a lint trap chamber 56, an outlet port 60 (FIGURE 5) and a damper 61 and duct 77 back to the blower 54. The air circulating path for a freshening operation runs from the room through an inlet port 32 into the damper chamber 28, the inlet duct 24, the washer-extractor-dryer casing 11a, the outlet duct 26, the lint trap chamber 56, an outlet port 62 of the lint trap chamber 56 (FIGURE 5), a damper box 63 (FIGURES 1 and 2), a duct 69, and a blower 80 through an outlet 82 which is normally vented to the outside of the building. The details of construction of the apparatus forming the circulating paths are herein next described.

The damper chamber 28 is in constant air communication with the casing 11a of the washer-extractor-dryer via the inlet duct 24 and a fitting 25 which connects this duct to the side of the casing. Similarly, the casing 11a is in constant air communication with the lint trap chamber 56 via a fitting 27 on the other side of the casing 11a and the outlet duct 26. The ducts 24 and 26 are formed by flexible piping to allow for vibration between parts during rotation of the tub.

The damper chamber 28 at the right forward portion of the washer-extractor-dryer (FIGURES 4 and 5) controls the admission of either heated air from the heater 49 via the damper port 29 or of cool room air from the outside via the damper port 32. The damper port 29 on the inside wall has a surrounding lip 30 forming a valve seat against which a diaphragm damper 31 is operable by air pressure to seal the port as later described. The damper port 32 on the outside wall has also a surrounding lip forming a valve seat 33 against which a diaphragm damper 34 is operable by air pressure to close this port.

The construction of each diaphragm damper is illustrated with respect to the damper 34 in FIGURE 7 taken by way of example. This damper comprises a disk-shaped holder 35 having a central opening through a pipe fitting 35a and having a turned-over peripheral rim 35b. A flexible diaphragm 36 as of molded rubber overlies the inner face of the holder and is secured to the rim 35b by a clamping band 37. A pipe 35c is internally threaded into the fitting 35a to supply air pressure or suction to the chamber between the diaphragm and holder. When air pressure is applied the diaphragm is forced into an outer distended position against the adjacent valve seat 30 to close the port 29 as is shown in FIGURE 4. When suction is applied the diaphragm is withdrawn and the port is opened.

Figure 16:
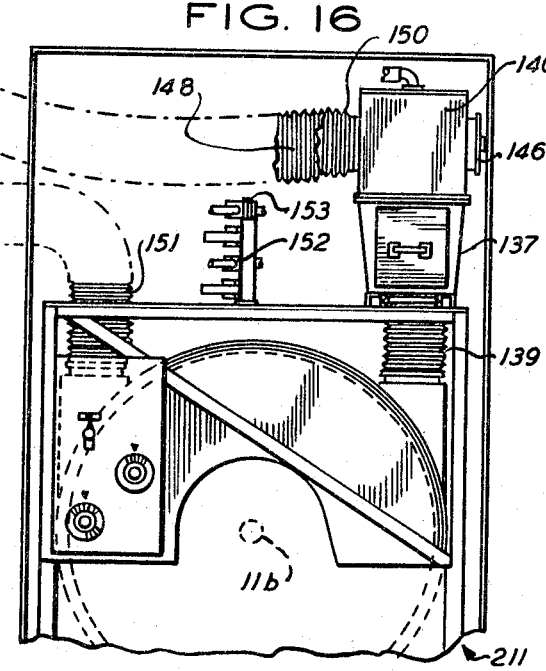
FIGURE 16 is a partial rear elevational view of this second washer-extractor-dryer.
Figure 15:
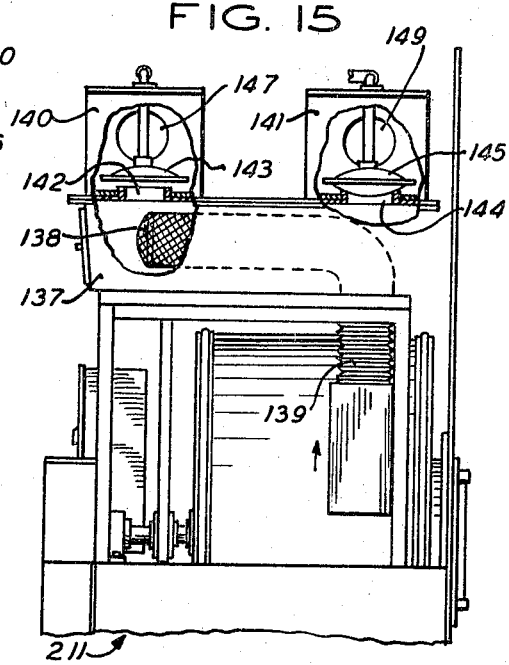
FIGURE 15 is a partial left-side elevational view of a second washer-extractor-dryer adapted to be connected also to the reclamation head shown in FIGURES 1-5.
Figure 17:
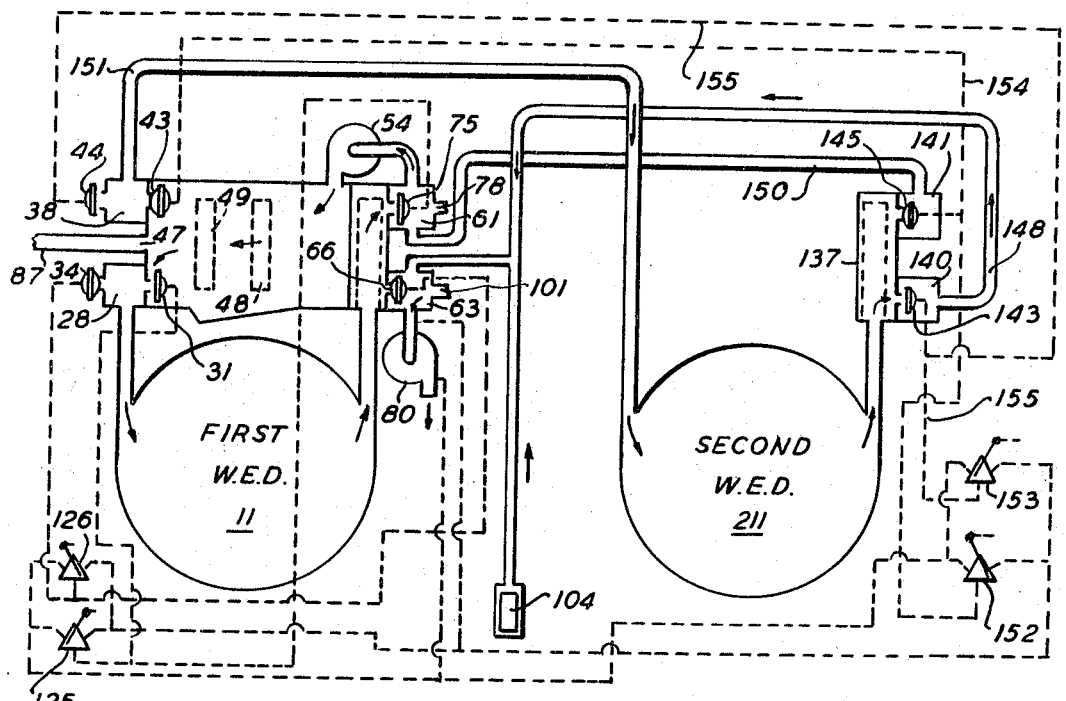
FIGURE 17 is a diagrammatic view of the air flow and damper control systems when a second washer-extractor-dryer is used but without showing the drying tumbler.

A second damper chamber 38 is provided at the right upper portion of the washer-extractor-dryer 11 and at the rear of the machine as shown in FIGURES 3, 5 and 8. As will appear, this damper chamber is used only when the reclamation head is to be connected to a second washer-extractor-dryer. The damper chamber 38 has a hot air port 39 and a fresh air port 41 corresponding respectively to the ports 29 and 32 of the damper chamber 28. These ports are controlled by respective diaphragm dampers 43 and 44 but when no second washer-extractor-dryer is used the port 41 is left open and the port 39 is sealed by a cap 40. The connection to a second washer-extractor-dryer is made from the damper chamber 38 via an opening 42 in the wall 10a (FIGURE 5) and thence via a suitable fitting 45 connected to an air duct 151 as shown in FIGURE 8. This air duct leads to a second washer-extractor as shown in FIGURES 15, 16 and 17.

The interior hot air chamber 46 of the reclamation head 10 is triangular in cross section as shown in FIGURE 4, and extends from front to back of the machine. Communication to this chamber may be had via either the port 29 or port 39 as above-described. Leading from this chamber 46 through the top plate 10a is a port 47 to which an air pipe 87 (FIGURES 2 and 4) is connected. This air pipe 87 is connected to the tumbler 12 and is an air duct controlled at the tumbler for circulating air from the chamber 46 when the tumbler is used in a drying operation, as is later described.

To the left of the hot air chamber 46 is the heater 49 in the heating chamber H, and to the left of the heating chamber is a condenser 48 in the condenser chamber C. A wall 51 separates the heating chamber from the hot air chamber 46, and a wall 50 separates the heating chamber from the condensing chamber.

The blower 54 is driven by a motor 55 mounted on the top plate 10a. The blower is connected through an opening 10c (FIGURES 4 and 5) in the plate 10a to circulate air into the condenser chamber C. From the condenser chamber the air passes through a perforated partition plate 52 into the heating chamber and from the heating chamber through the heater 49 into the hot air chamber 46. The condenser 48 comprises a group of tubes 48a through which is circulated a coolant such as cold water. Fins 48b in contact with the tubes increase the heat exchange area to augment the cooling effect of the coolant in the tubes on the air stream from the blower 54. Similarly, the heater 49 has a group of thin tubes 49a through which steam is circulated. Inlet and outlet tubes 48c for the condenser and inlet and outlet tubes 49c for the heater run out at the back of the machine through a panel 53 as shown in FIGURES 1 and 5.

The lint trap chamber 56 is separated from the condenser chamber by a solid inperforate wall 10b. Air from the washer-extractor-dryer casing 11a is led into this chamber through an opening 58a in the bottom wall 58. A tubular bag 57 of porous fabric provided in the chamber 56 has its open end sealed to a flange around the opening 58a to serve as a lint trap. The bag 57 can be removed via a door 59 (FIGURE 1) at the rear of the machine to change or clean the bag as needed.

Figure 2:
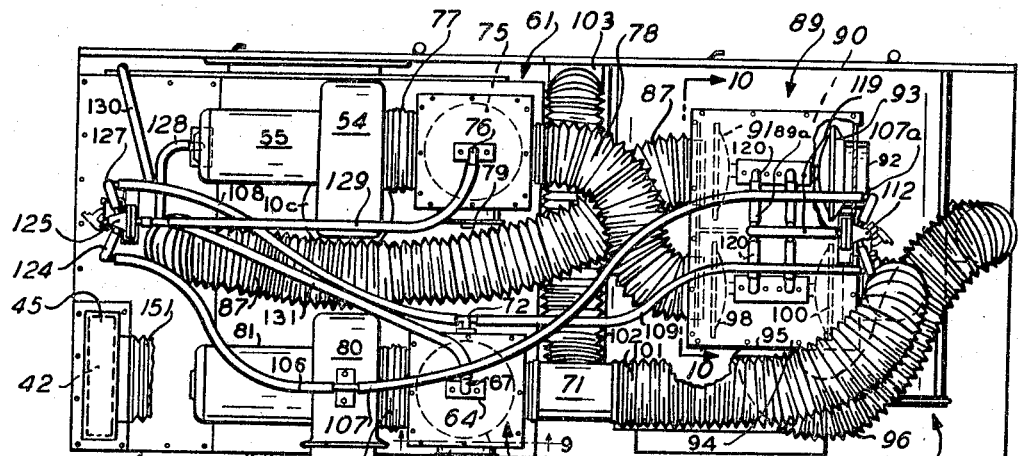
FIGURE 2 is a top plan view of this combination machine.
Figure 3:
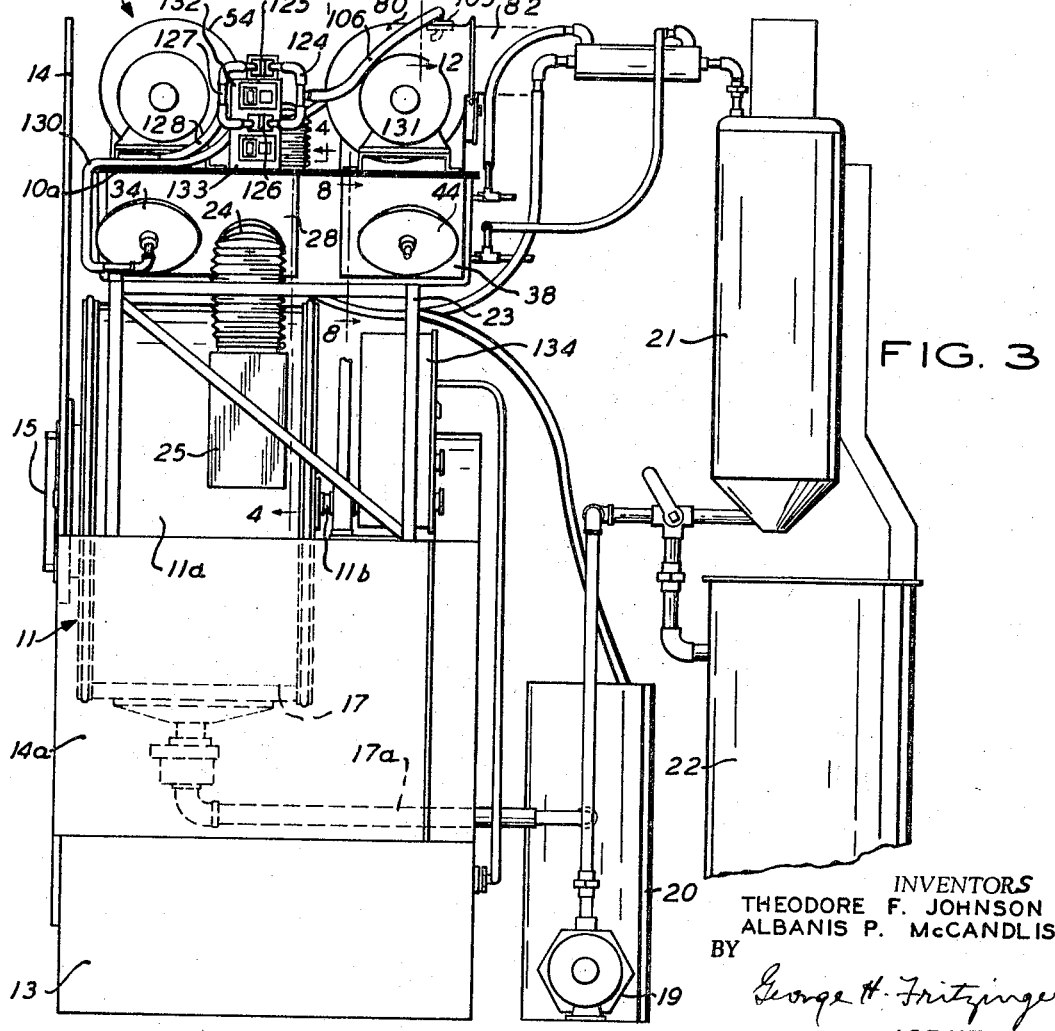
FIGURE 3 is a right hand elevational view of the washer-extractor-dryer showing also a solvent circulating means at the rear of the machine.

An opening 60 in the plate 10a near the front of the chamber 56 provides an outlet to the damper box 61 shown in FIGURES 2 and 4. Similarly, an opening 62 in the plate 10a near the back of the machine provides an outlet from the lint trap chamber 56 to the damper box 63. The opening 62 has a surrounding lip 62a extending into the damper box and forming a valve seat for a diaphragm damper 66 as shown in FIGURE 9. The diaphragm damper 66 is operated via a tube 65 leading through a fitting 64 in the top wall of the chamber. An L coupling 67 connects the upper end of the tube 65 to a suction hose 131. The blower 80 is driven by a motor 81 and has an outlet duct 82 at the back of the machine (FIGURE 2) and an inlet duct 69 from the damper box 63. The blower draws air from the chamber 56 to circulate fresh room air through the work load after a drying and reclaiming operation. Another opening 70 in the damper box 63 connects to a T coupling 71 which is connected via air duct 101 to the tumbler 12 and via duct 102 to the outside. In another wall of the damper box 63 is a T fitting 72 connected to valve control hoses 108 and 109. Another opening 73 in the damper box is closed by a cap 74.

The damper box 61 is the same as the damper box 63 except that it does not have a connection corresponding to the fitting 72. It has a diaphragm damper 75 similar to the damper 66 (FIGURE 2) which is operated via a hose 129 and it has a side opening connected via an air duct 77 to the input of the blower 54 and another side opening connected via an air duct 78 to a damper box 94 on the tumbler. Another side opening is closed by a cap 79. As before described, the blower circulates the air to carry out a drying and reclaiming operation.

In a drying reclaiming operation, the damper 75 is open, the damper 66 is closed, damper 31 is open and damper 34 is closed. Hot solvent laden air is drawn from the washer-extractor-dryer 11 through the duct 26, lint trap chamber 56, damper box 61, duct 77, blower 54 and condenser chamber C. As the air is passed through the condenser, the solvent vapor is condensed and collected on the inclined bottom wall of the condenser chamber where it is carried out by drain 83 (FIGURE 4) and water separator 84 into the reservoir 13 (FIGURE 1). The air passes from the condenser chamber through the perforated plate 52, heater 49, damper port 29, chamber 28, air duct 24 and back into the washer-extractor-dryer 11. This circulation is continued until the load is dried. Thereupon the four dampers just mentioned are reversed to the positions shown in the figures: to wit, refresher damper 66 is open, reclaimer damper 75 is closed, freshener inlet damper 34 is open and reclaimer damper 31 is closed. Room air is then drawn inwardly via the port 32, chamber 28, air duct 24, washer-extractor-dryer 11, air duct 26, lint trap chamber 56, damper box 63, blower 80 and exit duct 82. By this freshening operation the clothes are freed of residual solvent odor and are cooled.

The chamber 46 which runs from front to back of the machine has a central opening 47 in the top plate 10a (FIGURE 5) which is connected by an air duct 87 to a port 88 of the tumbler damper box 89 (FIGURES 2 and 10). This tumbler box has a central partition wall 89a dividing it into two damper chambers 90 and 94. The damper chamber 90 is connected to the air duct 87 and is open at the bottom to communicate with the interior of the tumbler tub 18 forming an inlet opening thereto. This inlet port for the duct 87 is controlled by a diaphragm damper 91. An opening 92 in the opposite wall of the damper chamber 90 is a fresh air port and is controlled by a diaphragm damper 93. (FIGURES 2 and 10).

The other damper chamber 94 is closed at the bottom as shown in FIGURES 10 and 11. An opening 95 in the damper wall at the rear of the machine is connected by an air duct 96 to a chamber 12c at the bottom of the tumbler (FIGURE 1). The chamber 12c houses a conventional lint trap not shown and connects with the interior of the tumbler tub. An opening 97 in the right hand wall of the chamber 94 is controlled by a diaphragm damper 98 and is connected by an air duct 78 to the reclaimer damper box 61. An opening 99 in the opposite wall is controlled by a diaphragm damper 100 and is connected via a duct 101 (FIGURES 2 and 11) and a fitting 71 to the damper box 63.

The tumbler dampers are shown in the drying-reclaiming position. For example, in FIGURES 2 and 11 the dampers 91 and 98 are open and the dampers 93 and 100 are closed. Hot solvent laden air is therefore drawn from the tumbler through the air duct 96 (FIGURE 1) to the damper chamber 94 and through the damper port 97 and duct 78 to the damper box 61. At this point the air is blown by the blower 54 from the damper box 61 via the condenser 48, heater 49, chamber 46, air duct 87, damper chamber 90 and the opening in the bottom wall of the damper chamber 90 to the drying tumbler. This circulation is continued until the load is dried and the vapor solvent reclaimed. Thereupon the reclaimer dampers 91 and 98 are closed and the freshener dampers 93 and 100 are opened to draw room air through damper port 92, damper chamber 90, the drying tumbler 12, bottom lint trap chamber 12c, air duct 96, outlet damper chamber 94, damper port 99, air duct 101, damper box 63, blower 80 and outlet port 82. In this freshening operation the air passes simply through the damper box 63 from the T fitting 71 to the blower 80 without passing any dampers, the only damper in this box being the damper 66 in the bottom wall to the washer-extractor-dryer 11. Similarly, in a reclaiming drying operation the air passes simply through the damper box 61 to the blower 54 without passing any dampers in the box.

The T fitting 71 shown in FIGURE 2 has a branch via duct 102 to a fitting 103 connected to an opening 104 in the front panel of the tumbler as shown in FIGURE 6. Thus, the blower 80 operates constantly to draw air from the dry cleaning apparatus near the floor and to exhaust it through the opening 82 at the back of the machine so as to remove stray vapors from the room.

Each diaphragm damper is extended by air pressure to close the associated port and is retracted by air suction to open the port. The use of air suction is more positive and reliable than to rely merely on the resilience of the diaphragm or on a spring return force to retract the diaphragm when the air pressure is removed.

Each of diaphragm of the dampers is of a diameter substantially greater than the associated port so that the diaphragm will operate like a piston and enable the port to be closed by air pressure of the same order of magnitude as the pressure of the air being controlled. The source of operating pressure and of suction is taken from one of the blowers, it being from the blower 80 in the present illustrated example. For this purpose an L fitting 105 is connected to the blower 80 in the exhaust side (FIGURE 3) with its input nozzle directed into the air flow to obtain a slight increase in pressure. This fitting is connected to the pressure hoses 106 and 107. For obtaining a suction or slightly sub-barometric pressure a fitting 72 is installed in the damper box 63 at the inlet side of the blower 80. This fitting is connected to the suction hoses 108 and 109.

The air pressure hose 106 and the air suction hose 108 are connected through a valve 125 on the washer to feed either pressure or suction to the diaphragm damper 75 via a tube 129 (FIGURES 1 and 2) and through a valve 126 to feed either pressure or suction to the diaphragm damper 66 via a tube 131. Similarly, the air pressure hose 107 and air suction hose 109 are connected through a valve 112 on the tumbler 12 (FIGURES 1, 10 and 11) to feed either pressure or suction to the diaphragm dampers 91 and 98 via a tube 119 and through a valve 113 to feed either pressure or suction to the diaphragm dampers 93 and 100 via a tube 121. The valves 112 and 113 are illustrated in detail in FIGURES 10, 11 and 13, and from the detailed description thereof which follows the construction of the valves 125 and 126 on the washer will be apparent although shown only generally in FIGURES 2 and 3.

The pressure hose 107 is connected through a T coupling 107a to nipples 110 and 111 at one side of the respective valves 112 and 113 and suction hose 109 is connected through a T coupling 109a to nipples 114 and 115 at the other side of these valves respectively. These valves are mounted on a bracket 116 on top of the damper chamber 94. They are conventional flap valves. For instance, as shown in FIGURE 13, the valve 112 has a central chamber 112a with side ports leading through the nipples 110 and 114. In the chamber is a flap 112b reciprocable about a pivot 112c to close either port while leaving the other port open. Leading from this central chamber is the outlet pipe 119. The flap 112b is biased by a spring 118 normally to close the port to the suction hose 109 and is operable by a solenoid 117 to open the port to the suction hose and close the port to the pressure hose 107. Thus, the valve is normally open to pressure and closed to suction, and when the solenoid is activated the valve is opened to suction and closed to pressure. The central outlet pipe 119 is connected via a T coupling 120 to the diaphragm dampers 91 and 98 controlling the drying-reclaiming operation of the tumbler 12. These two dampers are operated in unison to close position from the pressure hose 107 when the solenoid 117 is not operated and to open position from the suction hose 109 when the solenoid 117 is operated.

The valve 113, like the valve 112, is normally open to pressure and closed to suction. Its central outlet is connected by a pipe 121 and T coupling 122 to the diaphragm dampers 93 and 100 which control the freshening operation of the tumbler. The valve is operated by the solenoid 123 into position wherein it is closed to pressure and open to suction. Thus, the dampers 93 and 100 are closed from pressure hose 107 when the solenoid 123 is not operated and are opened from suction hose 109 when the solenoid 123 is operated.

The valve 125 on the washer is controlled by solenoid 132 ad the valve 126 by solenoid 133. When the solenoid 132 is not energized the valve 125 is in its normal position closing off suction and admitting pressure. Pressure is therefore going by way of hose 128 to diaphragm damper 31 to close it. Pressure is also going by way of hose 129 to diaphragm damper 75 to close it. The reclaiming circuit is therefore blocked off. The valve 126 is in the opposite position operated by its solenoid 133 to close off pressure and admit suction. Suction is therefore going by way of hose 130 to the diaphragm damper 34 to hold it open and suction is going by way of the hose 131 to the diaphragm damper 66 to hold it open. Room air is therefore being drawn in through the port of damper 34 and through damper chamber 28 through the washer and out the lint trap to the port 66 in the damper box 63 and through the damper box to the inlet of the blower 80 and thence out through the duct 82.

With reference further to the diagrammatic view of FIGURE 14, it will be seen that for the tumbler 12 pressure is led by way of the hose 107 and T coupling 107a to the valves 112 and 113 and suction is led to these valves by way of the hose 109 and T coupling 109a. The valve 113 is in normal position to admit pressure and close off suction. Pressure is therefore going by way of the pipe 121 and T coupling 122 to the diaphragm damper 93 and the damper 100 to close both of these dampers. The freshener circuit is therefore blocked off. The valve 112 is operated by solenoid 117 to close off pressure and admit suction. Suction is therefore going by way of the pipe 119 and T coupling 120 to hold open the dampers 98 and 91. This establishes the reclaiming-drying operation. Solvent laden air is therefore going out of the bottom of the tumbler through the lint trap 12c, duct 96, damper chamber 94, port of damper 98, duct 78, damper box 61, duct 77, blower 54, reclaiming head via the condenser 48 and heater 49, duct 87, port of damper 91 in damper chamber 90 and back into the top of the tumbler.

Since the pair of reclaim-drying dampers 91 and 98 are both open or both closed at the same time they are operated by the single valve 112. Likewise, since the freshener dampers 93 and 100 are also both open or both closed at the same time they are operated by the one valve 113. Similarly, on the washer-extractor-dryer 11 the reclaim-drying dampers 31 and 75 are both open or both closed at the same time and are operated by the single valve 125, and the freshener dampers 34 and 66 are both opened or both closed at the same time and are operated by the single valve 126. Thus, the washer and the tumbler are controlled respectively by a pair of valves.

The washer-extractor-dryer 11 and the tumbler 12 are independently operable, since each is provided with the necessary motor controls, etc., as well as controls for operating the damper control valve solenoids as required. Also, the W.E.D. 11 might be arranged either for operation by the plant operator or for coin operation. When the volume of work is such that it can be handled by the W.E.D. 11, the tumbler would not be in use (although the operator might at such time utilize the tumbler for any other drying, from other equipment in the plant, etc.). Depending on whether one or both machines were operating and on what step was in progress, the reclamation head 10 might be reclaiming from both the W.E.D. 11 and the tumbler 12 at the same time, or from one or neither of them; similarly, the same is true as to the freshening operations. A greater volume of work can be handled by a transfer unit than by a W.E.D. The present unit is arranged to be use das a transfer unit when desired. To do this, control equipment can be set so that the W.E.D. 11 will operate just through its washing and extracting steps. The load is then transferred to the tumbler for drying. Various suitable electric control arrangements could be used, either manually or automatically operated. In a preferred arrangement, the W.E.D. 11 is provided with a timer indicated generally at 134, comprising a section having a dial 136 settable to control the washing and extracting stages, and a section having a dial 135 settable to control the drying and freshening steps. The electrical control of the tumbler is manually operated. Also, when the machines are operated as a transfer unit, the drying and freshening in the tumbler can be controlled by the operator. Alternatively, the drying section of timer 134 can be electrically switched over to provide a timed control for the tumbler.

In FIGURES 15 and 16 there is shown a second washer-extractor-dryer 211 adapted to be connected also to the reclamation head 10. This second washer-extractor-dryer is provided with a lint trap box 137 which contains a lint bag 138 and which is connected to the outlet of the washer-extractor-dryer casing via an air duct 139. Further, this washer-extractor-dryer has two outlet damper boxes 140 and 141 but no inlet damper boxes since the inlet damper boxes employed in connection with the second washer-extractor-dryer are on the reclamation head. The damper boxes 140 and 141 are mounted on the top of the lint trap box 137. A flanged opening 142 leading from the lint trap box through the bottom wall of the damper box 140 is controlled by a diaphragm damper 143. Similarly, a flanged opening 144 leading from the lint trap box through the bottom wall of the damper box 141 is controlled by a diaphragm damper 145. Each damper box has an opening in its left wall (as seen from the front of the machine) which is not used in a two washer-extractor-dryer combination and which is therefore closed by a cap 146.

The damper box 140 may serve, for example, as the freshener control and the damper box 141 as the drying-reclaiming control. An opening 147 in the box 140 is connected by an air duct 148 to the damper box 63 (FIGURE 17), the connection to the box 63 being made via the opening 73 after removing the cap 74 (FIGURE 2). The opening 149 in the reclaiming damper box 141 is connected by an air duct 150 to the damper box 61, the connection to the latter being made via the side opening thereof after removing the cap 79. An air inlet duct leads from the damper chamber 38 via the fitting 45 (FIGURE 8) and air duct 151, but the cap 40 on the opening 39 is now removed and the two diaphragm dampers 43 and 44 are connected to the two pressure-vacuum valves 152 and 153 via respective hose connections 154 and 155.

In the diagram shown in FIGURE 17, the first washer-extractor-dryer 11 is drying-reclaiming and the second washer-extractor 211 is refreshening. As to the first washer-extractor-dryer 11, its freshener control valve 126 is in "pressure" position and its reclaim valve 125 is in "suction" position. Accordingly, the freshener dampers 34 and 66 are closed and the reclaim dampers 31 and 75 are open. As shown by the arrows, circulation is therefore from the washer-extractor-dryer 11 via the damper 75, blower 54, condenser and heater of reclamation head 10, damper 31 and back to the washer-extractor-dryer.

Further, as shown in FIGURE 17 the valve 153 of the second washer-extractor-dryer 211 is in "suction" position (obtained from the inlet of the blower 80) and this suction is transmitted via a hose 155 to the damper 143 to hold it open. The suction is also transmitted via the hose 155 to the damper 44 to hold it open. The valve 152 is in "pressure" position (obtained from the outlet of the blower 80) and this pressure is transmitted via a hose 154 to the reclaim damper 145 to hold it closed. Also, this pressure is transmitted by the hose 154 to the reclaim damper 43 to hold it closed. Room air is therefore being drawn in through the fresh air damper 44 via air duct 151 to the inlet of the washer-extractor-dryer 211, and from the outlet of the washer-extractor-dryer through the lint trap 137, damper 143, air duct 148, damper box 63, blower 80 and discharge. In a drying-reclaiming operation, the positions of the valves are reversed. Solvent laden air would then go out of the washer-extractor-dryer 211 through the lint trap 137, damper 145, air duct 150, damper box 61, blower 54, condenser and heater of reclamation head 10, damper 43 and back through the air duct 151 to the inlet of the washer-extractor-dryer.

Figure 18:
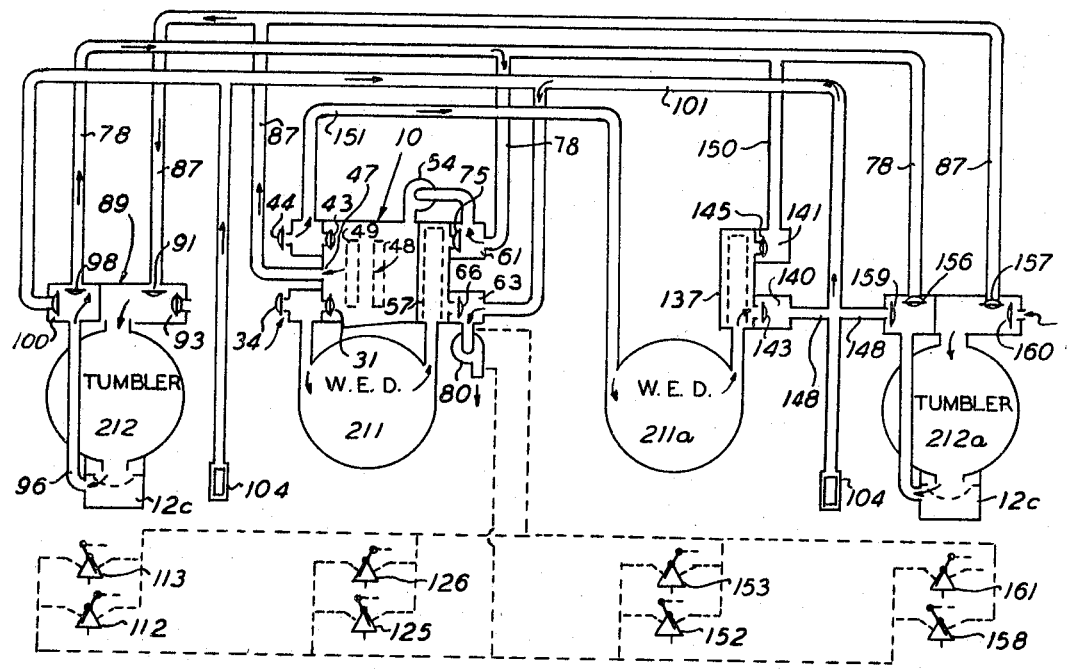
FIGURE 18 is a diagrammatic view of the air flow and damper control system for a combination of two washer-extractor-dryers and two tumblers.

A further illustrative embodiment of the invention comprising a combination of two washer-extractor-dryers 211 and 211a and two tumblers 212 and 212a is shown in FIGURE 18. The four units are shown as operating simultaneously in air circulating condition although this would not likely occur in practise. For simplicity, some air pipes are shown extending across each other with branches going to the various points, and the suction and pressure hoses from the valves to the respective dampers are not shown since their connections are indicated from the previous figures.

In FIGURE 18 the valve 125 is in "pressure" position to close the reclaim dampers 31 and 75 of the W.E.D. 211, and the valve 126 is in "suction" position to open the freshener dampers 34 and 66 of this unit. Room air is therefore being drawn in at damper 34 and goes through the W.E.D. 211 unit and then out through damper 66 and blower 80 to discharge. The valve 113 is in "pressure" position to close the freshener dampers 93 and 100 of the tumbler 212 and the valve 112 is in "suction" position to open the reclaim dampers 91 and 98 of this unit. Thus, air flow is going from the tumbler 212 via damper 98, air pipe 78, damper box 61 on the reclamation head 10, blower 54, condenser 48, heater 49, air pipes 87, damper 91 and back to the tumbler 212. The valve 152 is in "pressure" position to close the reclaim damper 145 of the W.E.D. 211a unit and to close reclaim damper 43 on the reclamation head 10. Also, the valve 153 is in "suction" position to open the freshener damper 143 of the W.E.D. 211a unit and to open the freshener damper 44 on the reclamation head 10. Room air is therefore being drawn in at damper 44 and goes via air pipe 151, W.E.D. 211a unit, damper 143, air pipes 148 and 101, damper box 63 and blower 80 to discharge. Also, the valve 158 is in "pressure" position to close the reclaim dampers 156 and 157 of the tumbler 212a and the valve 161 is in "suction" position to open the freshener dampers 159 and 160 of this unit. Room air is therefore being drawn in at the damper 160 and goes through the tumbler 212a and thence through damper 159, air pipes 148 and 101, damper box 63 and blower 80 to discharge. The alternate condition for each unit will be effected by reversing the positions of the respective dampers in which case the air flow path will be apparent.

It will be understood that in each of the respective embodiments shown by FIGURES 1–14, FIGURES 15–17 and FIGURE 18, the washer-extractor-dryer may be employed simply as a washer-extractor or transfer unit in which case the drying tumbler is always employed to perform the drying operation. Of course, if it is desired that the washer-extractor-dryer be always limited to use only as a washer-extractor the operative connections of the washer-extractor to the reclamation head would be eliminated or disabled. In these and other respects the embodiments herein particularly shown and described are intended as being illustrative and not necessarily limitative of our invention since the same are subject to changes and modifications without departure from the scope of our invention, which we endeavor to express according to the following claims.

We claim:

1. In a dry cleaning apparatus wherein a dry cleaning fluid is circulated through or across the objects being cleaned: the combination of a plurality of drying units comprising a washer-extractor-dryer and at least another washer-extractor-dryer or drying tumbler, each of said drying units including a rotatable perforated cylinder and an enclosing casing, a single reclamation head including a cooler, a heater, and a fluid duct system between said casings and reclamation head including a blower and damper controls selectively operable to circulate air in a closed circuit through any selected number of said casings at any one time via said cooler and heater in sequence, said damper controls being of a diaphragm type operable by pressure into closed position and by suction into open position, means including a reservoir for collecting the vapor condensed from the air in said closed circuit as the air passes said cooler, and a valve system for selectively applying air pressure from the outlet side of said blower to close said damper controls and for selectively applying suction from the inlet side of said blower to open said damper controls.

2. In a dry cleaning apparatus wherein a dry cleaning fluid is circulated through or across the objects being cleaned: the combination of a plurality of drying units comprising a washer-extractor-dryer and at least another washer-extractor-dryer or drying tumbler, each of said drying units including a rotatable perforated cylinder and an enclosing casing, a single reclamation head includig a cooler and a heater, a fluid duct system between said casings and reclamation head including dampers and first and second blowers, means including a reservoir for collecting vapor condensed from the air as the air passes said cooler, means for setting said dampers to connect said first blower to circulate air in a closed circuit through any selected number of said casings at any one time via said cooler and heater to pick up cleaning fluid from said objects and cause the cleaning fluid to be condensed and returned to said reservoir, said second blower having an outlet duct to the outside and an inlet duct connectable selectively to one or more of said casings to cause said second blower to circulate cool room air through any selected number of said casings at any one time whereby to freshen said objects and rid them of residual odors of said cleaning fluid said dampers being of the diaphragm type having pipe connections for applying pressure to close the dampers and for applying suction to open the dampers, and an air piping system including valve means for connecting said respective dampers selectively to the inlet or outlet of one of said blowers whereby to open or close the dampers.

3. A dry cleaning apparatus including a washer-extractor-dryer and a drying tumbler each including a rotating perforated cylinder and an enclosing casing, a frame structure mounting said washer-extractor-dryer and drying tumbler as a unit, a reservoir for cleaning fluid mounted in said frame unit, a reclamation head mounted in said frame unit, said reclamation head including a cooling chamber having a condenser therein and a heating chamber having a heater therein with means connecting the outlet of said coolig chamber to the inlet of said heating chamber, a first lint trap chamber connected to the outlet of said washer-extractor-dryer casing, a second lint trap chamber connected to the outlet of said drying tumbler casing, a first blower having its outlet connected to said cooling chamber, a duct system and damper controls to connect the inlet of said first blower to one or both of said lint trap chambers and concurrently to connect the outlet of said heating chamber to one or both inlets of the respective casings for circulating air respectively through one or both of said casings via said condenser and heater whereby to pick up and condense the cleaning fluid from the objects in the selected casing or casings, a second blower having its outlet connected to the outside, and a duct system and damper controls for connecting the inlet of said second blower to one or both of said lint trap chambers and for concurrently connecting one or both inlets of the respective casings to the outside whereby fresh room air is circulated through one or both of said casings selectively, said damper controls being of the diaphragm type operable closed by air pressure and operable open by air suction, including a valve system for selectively controlling the feed of either operating pressures or suction to said respective damper controls.

4. The dry cleaning apparatus set forth in claim 3 wherein each damper control includes a port hole and an associated diaphragm substantially larger in diameter than the diameter of the respective port hole to provide a diaphragm piston action enabling each diaphragm damper to be operated by pressure and suction of the order of the pressure and suction in the ducts being controlled.

5. The dry cleaning apparatus set forth in claim 3 including pipe connections from the inlet and outlet of one of said blowers running via said valve system to said respective diaphragm dampers for operating the diaphragm dampers into closed and opened positions by the pressure and suction respectively at the outlet and inlet sides of said one blower.

6. A dry cleaning apparatus including first and second washer-extractor-dryers and first and second drying tumblers each comprising a perforated rotatable cylinder and an enclosing casing, a single reclamation head including a cooling chamber having therein a condenser and a heating chamber having therein a heater with means connecting the outlet of the cooling chamber to the inlet of the heating chamber, a duct and damper controls for connecting said heating chamber selectively to one or more of the inlets of said drying tumbler casings, a plurality of damper chambers and respective damper controls for connecting said respective damper chambers either to said heating chamber or to the outside, ducts respectively connecting said damper chambers to the inlets of said respective washer-extractor-dryer casings, lint trap chambers connected respectively to the outlets of said casings, a blower having its outlet connected to said cooling chamber, a second blower having its outlet connected to the outside, a duct system and damper controls for selectively connecting one or more of said lint trap chambers to the inlet of said first blower for circulating air through the respective casing or casings via said condenser and heater to pick up and condense out cleaning fluid from the objects in the casing or casings, a duct system and damper controls for selectively connecting the inlet of said second blower to one or more of said lint trap chambers and for concurrently connecting the inlets of the respective casings to the outside air whereby fresh room air is circulated through the selected casing or casings by said second blower, said damper controls being of the diaphragm type and including an air pipe system and valve means for operating the damper controls respectively to open position by air suction from the inlet of one of said blowers and to closed position by air pressure from the outlet of one of said blowers, and solenoid means for selectively operating said valve means.

References Cited
UNITED STATES PATENTS

| | | | |
|---|---|---|---|
| 2,114,776 | 4/1938 | Davis | 68—19 X |
| 2,146,622 | 2/1939 | Johnson | 68—20 |
| 3,134,652 | 5/1964 | D'Angelo et al. | 68—18 X |
| 3,206,950 | 9/1965 | Xeros | 68—18 X |
| 3,246,493 | 4/1966 | Oles | 68—18 X |

FOREIGN PATENTS

| | | |
|---|---|---|
| 1,078,012 | 5/1954 | France. |
| 1,240,375 | 7/1960 | France. |
| 847,809 | 9/1960 | Great Britain. |

WILLIAM I. PRICE, *Primary Examiner.*